United States Patent Office 3,175,915
Patented Mar. 30, 1965

3,175,915
MANUFACTURE OF AMERICAN CHEESE
Jack E. Murphy, Dallas, Tex., assignor to National Dairy Products Corporation, New York, N.Y., a corporation of Delaware
No Drawing. Filed June 26, 1963, Ser. No. 290,631
6 Claims. (Cl. 99—116)

This invention relates generally to the manufacture of American cheese and more particularly relates to an improved method of manufacturing and curing highly flavored American cheese in a short period of time.

The term "American cheese," for the purposes of this invention, includes any cheese which has the characteristics of Cheddar cheese, whether made according to the stirred curd procedure or the milled curd procedure, or any other procedure that provides a cheese curd having the characteristics of cheese made according to these procedures.

In the manufacture of American cheese, raw or pasteurized milk is placed in a vat and a lactic acid starter is added to the milk. When the desired degree of lactic acid development has been attained, rennet is added in order to set or coagulate the milk, the resulting curd is cut and the vat is heated for a period of time sufficient to permit the curd to firm and additional lactic acid to develop. The whey is then drained from the curd and the curd is stirred or cheddared and milled. The curd is then salted, pressed into hoops, and cured, i.e., aged, during which time characteristic cheese flavor develops due ot bacterial action.

The length of the aging or curing of the curd depends upon the use for which the cheese is intended, and the degree of flavor development desired. The curd may be used immediately, or may be cured for 10 to 30 days, if it is to be used as current or body cheese in the manufacture of process cheese. The curd may be cured for five or six months to provide short held cheese having a characteristic medium flavor which is also used in the manufacture of process cheese. Upon additional curing, the cheese flavor develops further and, after about a year, the cheese is considered to be aged cheese and is highly flavored. As used herein the term "aged cheese" means a Cheddar type cheese that has been cured for a period of at least one yeear. Aged cheese may be consumed as is, or may be combined with current and/or short-held cheese to make process cheese, the aged cheese imparting a desirable flavor to the process cheese.

In the manufacture of process cheese, a blend of current cheese, and/or short-held cheese, and/or aged cheese is comminuted and placed in a cooker, along with a small amount of emulsifying salt, such as disodium phosphate and heated. The resulting product which is process cheese, is packaged while hot.

The curing of cheese curd to provide a highly flavored aged cheese is done under rigidly controlled temperature conditions in order to produce cheese having uniform flavor and body characteristics. In order to provide aged American cheese having a desirable flavor, the whey is normally removed from the cheese curd at a whey acidity of about 0.26 percent (acidity being expressed herein as percent lactic acid or equivalent). The curd is cheddared or stirred and salted with an amount of salt so that the total salt of the curd is within the range of 1.65 to 2.0. The fresh cheese curd that is to be aged will have a pH above 5.0 and preferably within the range of 5.1 to 5.2. Aged cheese produced according to conventional processes has a pH within the range of 5.3 to 5.6. Lower pH values of the cheese curd cause fluctuations in the quality and flavor of the aged cheese produced. The cheese curd is normally aged at a temperature within the range of 35° F. to 55° F. in order to control the bacterial action and obtain an aged cheese product having the desired flavor and body characteristics. Higher curing temperatures may cause blowing of the cheese and the formation of voids therein, as well as the production of off flavors.

It is the principal object of the present invention to provide an improved American cheese. It is another object to provide a method of manufacturing American cheese. A further object is to provide a method of manufacturing a highly flavored American cheese that does not require extended curing of the curd. A still further object is to provide a convenient and economical method of manufacturing American cheese having the characteristic flavor of aged Cheddar cheese that does not require extended curing of the curd, and provides a product having uniform flavor and body characteristics which is particularly suited for use as a raw material in the manufacture of process cheese and process cheese products.

Other objects and advantages of the present invention are more particularly set forth in the following detailed description.

In general, the method includes forming a cheese curd from raw or pasteurized milk by the addition of suitable amounts of a lactic acid starter and rennet, cutting and cooking the curd, salting the curd after the acidity rises to above about 0.40, reducing the moisture content of the curd to between about 31 percent and 35.5 percent, placing the curd in an airtight enclosure which substantially prevents the formation of mold therein, and curing the curd at a temperature within the range of about 65° F. to 80° F. until the pH of the cheese is within the range of about 5.0 to 5.40.

When cheese is made and cured according to the method of the present invention, a cheese product is obtained which has the characteristic flavor of aged cheese. Surprisingly, it has been found that the characteristic aged cheese flavor is developed after a substantially reduced curing time, i.e., less than 3 months, and generally less than 2 months.

When the present invention is practiced using a stirred curd cheese make, raw or pasteurized milk containing from about 3.0 percent to 3.6 percent of milk fat is introduced into a cheese vat maintained at a suitable temperature, e.g., 86° F., and is inoculated with the usual amount of a lactic acid starter. When the usual suitable acidity is reached rennet is added to set the curd. When the curd has attained a proper degree of firmness and the whey has an acidity of about 0.10 to 0.12, the curd is cut, using conventional curd knives, into cubes having a suitable size, e.g., one-fourth to one-half inch.

The cut curd is agitated in the cheese vat by suitable mechanical means to prevent agglomeration thereof, and is cooked to expel whey. The cooking of the curd is carried out at usual temperatures of between about 100° F. and 106° F., preferably at a temperature of about 102-103° F., the temperature of the vat being raised to within the indicated temperature range in about 30 minutes. The cooking and agitation of the curd is continued until the acidity of the whey reaches about 0.15 to 0.16, at which time the curd and free whey are pumped onto a suitable drain table, which is preferably maintained at a temperature of about 100° F.

The drain table is a relatively shallow vat which has a perforated bottom portion through which the whey can pass, but through which the curd cannot pass. A valved chamber is disposed beneath the perforated bottom for controlling the draining of the free whey from the curd.

The curd is continuously agitated while on the drain table to prevent agglomeration of the curd granules. Free whey is drained from the curd until the level of whey just covers the curd. The curd is then allowed to remain in the whey as the acidity builds up. When the acidity reaches about 0.26 to 0.30, and preferably about 0.28, the remainder of the free whey is drained off leaving a moist granular curd. The moist granular curd is retained on the drain table after the whey has been drained therefrom, and the acidity is allowed to continue to build up. During this period, the curd is sufficiently agitated to prevent agglomeration and matting of the curd. The increase in the acidity of the curd after the free whey has been drained therefrom causes the curd granules to shrink and additional whey is expelled from the curd.

When the acidity of the whey reaches at least about 0.40, generally about 0.40 to 0.60, and preferably about 0.50, the curd is salted with a suitable amount of salt, i.e., sodium chloride, which salting causes the curd to shrink further, expelling a further amount of whey. The curd is agitated during salting to insure an even distribution of salt throughout the curd and to prevent agglomeration of the curd. The salt is added to the curd in an amount so that the curd preferably has a total salt content, including that salt initially present in the milk, of 1.2 percent plus or minus one-tenth percent. However, in practice it is contemplated that the total salt content of the curd may deviate slightly from this preferred value since a portion of the salt will be dissolved in the whey and drained from the curd with the whey. The deviation of the salt content of the curd may occur due to variances in the moisture content and degree of shrinkage of the curd in different cheese makes, which in turn causes a greater or lesser amount of whey to be expelled from the curd.

The granular curd obtained after salting has a moisture content of approximately 37 to 45 percent and generally has a moisture content of about 39 to 44 percent. To further reduce the moisture content of the curd to within a preferable range of 31 to 36 percent, a further amount of whey is removed therefrom. One advantageous method of removing additional amounts of whey includes drum draining of the curd. According to this method, the granular curd is transferred into a suitable lined drum or barrel and the whey is drained from the curd while the curd is in the drum. A suitable drum is a 55 gallon drum that has an acid resistant coating, e.g., plastic or the like, or which is provided with a suitable liner, such as a plastic bag. The drum is provided with a special perforated top through which the whey passes out of the drum. The special top has one-fourth inch holes spaced about one inch apart in an annular ring about 2 inches wide adjacent the edge of the top. The top is lined with conventional cheese bandaging cloths to prevent the curd from passing through the holes with the whey. In the drum draining process, the special top is fitted onto and attached to the drum containing the granular cheese curd and the drum is laid on its side. The drum is then preferably tipped slightly with the perforated top downwardly to increase drainage of the whey along the interior side wall of the drum and out of the holes in the perforated top. The drum may be rotated one half revolution after approximately 2 hours and drainage of the whey continued. After being allowed to drain for a suitable length of time, e.g., overnight, the moisture content of the curd is reduced to between about 34.5 to 35.5 percent, an average moisture content for curd produced according to the outlined drum draining method being 35 percent moisture.

The drum containing the cheese curd is then stood up on end with the perforated top up and the perforated top removed therefrom. According to a preferred form of the present invention, air is then substantially displaced from the interior of the curd containing barrels or drums. The displacement of the air from within the drum is believed to be partially responsible for the improved results obtained by the present invention, but is not considered to be absolutely essential to the method herein described. Air contains a certain amount of oxygen, and other oxidizing gases, which tend to cause the formation of undesirable mold and which may oxidize constituents of the curd, causing the cheese obtained therefrom to have an undesirable off flavor. If desired, the air may be displaced from the drums by the introduction into the drums of a gas which will not sustain mold growth, e.g., nitrogen, carbon dioxide or mixtures thereof. The introduction of a non-mold growth sustaining gas, preferably an excess thereof, further prevents the formation of mold and the production of off flavors by insuring that substantially all of the oxidizing gases are removed from the curd. It has been found that the non-mold growth sustaining gas should be introduced into the drums in an amount so that any remaining oxygen in the drum will be consumed by the bacteria in the cheese curd before any visible mold growth occurs. Generally, it is sufficient to reduce the air content in the drums to less than about 3 percent.

If desired, the air may first be exhausted from the drum by the application of a vacuum, e.g., a vacuum of about 24 to 27 inches of mercury, for a period of about 5 minutes before the non-mold growth sustaining gas is introduced therein. The vacuum may be applied by placing the curd in a suitable vacuum chamber. The drum is then preferably flooded with nitrogen, or other suitable non-mold growth sustaining gas. The curd containing drum is then sealed, preferably under a slight positive nitrogen pressure of about 3–5 p.s.i.g. by application of a suitable gasket and airtight cover.

The granular curd is then cured in the drum or barrel by storage in a suitable storage room having a controllable temperature. During curing, the temperature of the cheese is maintained within the range of about 65° F. to 80° F., and is preferably maintained within the range of about 72° F. to 74° F. until the pH of the curd is within the range of about 5.0 to 5.40.

At the end of one week the pH of the curd is within the range of about 4.75 to 4.90, preferably within the range of about 4.8 to 4.85. The curd is considered fully cured when the pH of the curd is within the range of 5.0 to 5.40, a pH within this range being obtained in less than about 8 weeks, generally in about 5 to 7 weeks, i.e., about 35 to 60 days. When the above described stirred curd make procedure is employed, highly desirable cheese curd is obtained when the pH of the curd is within the range of about 5.0 to 5.2, and preferably within the range of about 5.0 to 5.1, a pH within this range being generally obtained in about 6 weeks, although under certain circumstances shorter or longer curing periods may be employed.

Cheese curd having a pH within the indicated range is found to have a highly developed flavor that is equivalent to, or better than, the flavor of conventional aged cheese. Cheese manufactured according to the method of the present invention is considered to be equivalent in all respects to aged cheese when utilized in place of conventional aged cheese in any of the usual process cheese manufacturing operations, and may be used 100 percent in the manufacture of sliced process Cheddar cheese. When added to fresh curd and/or short-held cheese, the cheese of the present invention is found to melt evenly and readily mix with the other cheese curds. A process cheese which includes the cheese of the present invention in place of ordinary aged cheese is indistinguishable in flavor and body from conventional process cheese.

When the cheese curd of the present invention is used in the manufacture of a process cheese which is dried into a powder, it may be substituted for powdered process cheese made with aged cheese in any cooking process. Organoliptic tests cannot distinguish between a process cheese or process cheese product made with the cheese of the present invention and a process cheese or cheese product made with aged cheese, and in many instances the tests indicate a preference for the process cheese made with the cheese of the present invention.

The use of the cheese curd of the present invention is not limited to process cheeses. The highly flavored cheese curd may also be employed in other cooked cheese food products such as soups, souffles and baked goods.

In some instances, it may be desirable to reduce the moisture content of the cheese curd to below the 34.5 to 35.5 percent moisture content that is obtained when the above described drum draining method is employed. In such instances, a surface drying of the cheese curd may be employed by means of a drum drying operation. Air is circulated around the curd to reduce the moisture content to the desired level, e.g., to between about 31 to 33 percent moisture.

Generally, the drum drying can be conveniently effected as a batch operation in a rotatable drum. The moist curd is fed in a batch into one end of the drum and is removed from the drum through a suitable outlet adjacent the other end thereof. Drying air is passed through the drum by suitable means which include a heating unit to control the temperature of the air. The interior of the drum is preferably provided with projections or lifting vanes which cause the curd to be agitated, thereby insuring uniform drying thereof.

The length of time the curd remains in the dryer, and the temperature of the air that is passed into the dryer, may be controlled so that the curd obtained from the dryer has the desired moisture content of between 31 and 33 percent. The curd discharged from the drum is granular in form, the agitation imparted by the rotation of the drum preventing agglomeration thereof. The curd may then be placed into a drum or barrel for curing. Preferably the drum or barrel is of the type previously described, e.g., a 55 gallon drum, and the curd is preferably subjected to the described deaerating treatment to inhibit the formation of mold and the production of off flavors during curing. Cheese curd having a pH of about 5.0 to 5.40, obtained at the end of a 35 to 50 day curing period at about 74° F. has the desirable flavor characteristics of the drum drained curd previously described, and is considered equally suitable for use in place of aged cheese in the described cheese making process.

It is also posisble to utilize a milled curd cheese make procedure in the method of the present invention in place of the stirred curd procedure. In this connection, the milk is inoculated with a suitable starter, set with rennet, cut and cooked according to the described stirred curd procedure. When the acidity of the curd has reached the proper level, e.g., 0.26 to 0.30, the whey is drained from the curd and the curd is raked to the sides of the cheese vat and cheddared. Cheddaring is performed by permitting the curd to knit and mat into blocks, which blocks are cut into slabs. The slabs are then turned and piled and recut a number of times. During the cheddaring operation whey is expelled from the curd and is drained off through an outlet in the cheese vat.

When the cheddaring operation is completed, and when the curd has reached an acidity of about 0.40 to 0.70, the cheese slabs are cut into small chunks or pieces in a suitable cheese mill, after which the milled curd is sprinkled with dry salt and agitated sufficiently to thoroughly mix the salt with the curd. As in the stirred curd procedure, the amount of salt added to the curd is suitably selected so that the curd will have a total salt content of 1.2 percent plus or minus 0.1 percent, although as previously described, slight deviations in salt content from this preferred value are contemplated. The salted curd is then placed into suitable drums or barrels, such as the previously described 55 gallon drums. The curd is then preferably drum drained in the manner set forth above.

The curd is then preferably deaerated as previously described to prevent the formation of mold and the production of off flavors. The curd is cured at 65° F. to 80° F. until a pH of about 5.0 to 5.40, preferably 5.0 to 5.1, is reached. The cheese obtained is highly flavored and is considered to be equivalent to cheese obtained by the stirred curd procedure as hereinabove described.

Example I 27,000 pounds of pasteurized whole milk was introduced into a cheese vat and inoculated with a suitable amount of a lactic acid starter. When the acidity of the mixture reached the usual level, 1½ to 3 ounces of rennet per 1,000 pounds of milk was added thereto to set the curd. The milk was then allowed to coagulate. After coagulation, the curd was cut into one-fourth inch cubes using conventional curd knives. At the time of cutting the whey acidity was 0.10 to 0.11.

The temperature of the curd was raised to 104° F. and the curd was cooked while being agitated with a suitable mechanical agitator to keep the curd from agglomerating. When the acidity of the curd reached 0.15 to 0.16, the granular curd and free whey was pumped onto a drain table. A portion of the whey was drained from the curd until the level of the whey just covers the curd on the drain table. The curd was continuously agitated on the drain table to maintain it in granular form and the curd was allowed to remain in the whey until the acidity reached 0.28. When the acidity reached 0.28 the remainder of the free whey was drained from the curd. The moist curd was retained on the drain table and was agitated until the acidity of the curd reached 0.50.

At an acidity of 0.40, salt was added to the curd and mixed therewith in order to provide a curd having a total salt content of 1.2 percent plus or minus 0.1 percent. The granular salted curd was shoveled into 55 gallon steel drums having plastic bag liners, 5½ drums of curd being obtained from the drain table. Perforated tops, as herein described, were placed on the drums and the drums were placed on their sides in order to drain a further amount of whey from the curd. In this connection, the drums were allowed to drain for approximately 2 hours in one position and were then rotated 180° and allowed to drain further. After draining overnight the curd in the various drums had an average moisture content of 35 percent and a total salt content of 1.2 percent.

The drums were then stood back up on end and the air within the drums was removed by passing the drums through a vacuum chamber maintained at a vacuum of 27 inches of mercury. The vacuum was applied for a total period of approximately 5 minutes to each of the drums in order that substantially all of the oxygen and other mold producing gases were removed from the drums. The drums were then flooded with nitrogen to further insure the prevention of mold formation and an air tight top was affixed to the drums, retaining the nitrogen in the drums. The nitrogen in the drums was at a slight positive pressure of 3-5 p.s.i.g.

The sealed drums containing the granular curd were cured at a temperature of 74° F. After one week the pH of the curd in the various drums was within the range of 4.8 to 4.85, and after 6 weeks the pH in the drum varied from 5.05 to 5.1. At this pH the curing was terminated and the cheese curd was removed from the drums.

The cheese curd obtained had the characteristic flavor of aged cheese and could be substituted for aged cheese in the manufacture of process cheeses, sliced cheeses and powdered process cheeses. The flavor characteristics of the cheese obtained from the various drums is uniform in character and quality.

Example II

A further amount of cheese was manufactured according to the method described in Example I except that a milled curd procedure was employed in place of the stirred curd procedure. In this connection, 27,000 pounds of milk was inoculated with a starter, set with rennet, and cooked at 104° F. until an acidity of 0.28 was reached, at which time the whey was drained from the curd and the curd was raked to the sides of the cheese vat and cheddared. After cheddaring, the cheese was milled in a cheese mill and was salted at an acidity of 0.50 to provide a curd having a total salt content of 1.2 percent. The curd was then drum drained until a moisture content of 35 percent was obtained.

The drained curd was then subjected to a vacuum and nitrogen flooding and was cured in accordance with Example I until the pH of the curd was 5.05 to 5.1, the curing being effected in 6 weeks.

The cured cheese obtained was considered to be equivalent to the cheese obtained from Example I, and process cheese products made therefrom had the characteristic flavor of aged cheese process cheese products.

*Example III*

A cheese was manufactured according to Example I except that the curd was dried in a rotating drum dryer at a temperature of 115° F. instead of being drum drained. The granular curd obtained from the drum dryer had a moisture content of 32 percent and a total salt content of 1.2 percent. The curd was then subjected to a vacuum and nitrogen flooding treatment according to Example I and was cured at a temperature of 72° F. until the pH of the curd reached 5.05 to 5.10, the curing being effected in 6 weeks.

*Example IV*

The cheese obtained from Examples I through II were compared with a conventional aged Cheddar cheese by experienced cheese tasters. In this connection, a sample of each of the cheeses produced by the method set forth in Examples I through III, and a conventional aged Cheddar cheese that has been cured for a period of 12 months were used to manufacture process cheeses. The process cheese was formed by melting and mixing together 30 pounds of fresh curd, and 70 pounds of the various cheeses to be tested in a cooker at a temperature of 160° F. A disodium phosphate emulsifier was added to melted cheese mixture and the mixture was formed into a cheese loaf according to known methods. Experienced tasters were unable to detect the difference between the process cheese made with the conventional aged cheese and process cheese made with the cheeses of Examples I through III. All of the process cheeses had a desirable body and texture and had substantially identical flavors.

*Example V*

A further amount of each of the cheeses produced by Examples I through III, and a sample of a conventional aged cheese, were dried to provide powdered cheese samples suitable for commercial cooking operations. Experienced tasters considered all of the powdered cheese samples to have substantially the same flavor characteristics, and in some instances, indicated slight preference for the cheese manufactured according to the present invention as compared to the conventional aged cheese.

*Example VI*

A Cold Pack or Club cheese is manufactured with a cheese curd made according to the method described in Example I. The granular cheese is reconstituted, without heating, in a salt brine bath to add water and salt thereto up to the prescribed limits. A suitable amount of a coloring agent is added to the reconstituted cheese and the cheese is then cold packed. A Club cheese is obtained having a body, texture and flavor identical to conventional Club cheeses.

It can be seen that a method has been provided for manufacturing cheese for use in the manufacture of process cheese, which method provides a cheese product that is substantially identical to process cheese manufactured with conventional aged cheeses. Cheeses made according to the present invention attain desirable cheese flavor after a substantially reduced curing period. The cheeses are uniform in both flavor and body, and the production of cheese of improved flavor characteristics are reproducible. At present, it is not known precisely what phenomena is responsible for the surprisingly improved results obtained. However, it is recognized that the method provides a result which substantially reduces the curing period of the cheese curd, and yet provides a cheese having an identical flavor to an aged cheese.

Various of the features of the present invention are set forth in the following claims.

What is claimed is:

1. The method of making American cheese having a highly developed flavor which may be used in making process cheese and process cheese products, which method comprises the steps of setting milk with rennet, cutting the resulting curd, cooking said curd and expelling the whey therefrom, salting said curd when the whey acidity reaches at least about 0.40, reducing the moisture of said curd to from about 31 to 39 percent, and curing said curd in an air tight enclosure at a temperature of from about 65° F. to 80° F. until the pH of said curd is between about 5.00 and 5.40, whereby a cheese product is provided which has the characteristic flavor of aged cheese in a substantially reduced curing period.

2. The method of making American cheese having a highly developed flavor which may be used in making process cheese and process cheese products, which method comprises the steps of setting milk with rennet, cutting the resulting curd, cooking said curd and expelling the whey therefrom, salting said curd when the whey acidity reaches at least about 0.40, reducing the moisture of said curd to from about 31 to 39 percent, and curing said curd in an air tight enclosure in which there is insufficient oxygen to sustain mold growth at a temperature of from about 65° F. to 80° F. until the pH of said curd is between about 5.00 and 5.40, whereby a cheese product having the characteristic flavor of aged cheese is provided in a substantially reduced curing period.

3. The method of making American cheese having a highly developed flavor which may be used in making process cheese and process cheese products, which method comprises the steps of setting milk with rennet, cutting the resulting curd, cooking said curd and expelling the whey therefrom, salting said curd when the whey acidity reaches at least about 0.40 with an amount of salt so that said curd has a total salt content of from about 1.1 to 1.3 percent, reducing the moisture of said curd to from about 31 to 35.5 percent, displacing air from said curd with a nonmold growth sustaining gas to substantially prevent the formation of mold therein, and curing said curd in an air tight enclosure while in granular form at a temperature of from about 65° F. to 80° F. until the pH of said curd is between about 5.00 and 5.40, whereby a cheese product having the characteristic flavor of aged cheese is provided in a substantially reduced curing period.

4. The method of making American cheese having a highly developed flavor which may be used in making process cheese and process cheese products, which method comprises the steps of setting milk with rennet, cutting the resulting curd, cooking said curd and expelling the whey therefrom, salting said curd while in granular form at a whey acidity of between about 0.40 to 0.60 with an amount of salt so that said curd has a total salt content of from about 1.1 to 1.3 percent, reducing the moisture of said curd to from about 31 to 35.5 percent, displacing air from said curd with nitrogen to substantially prevent the formation of mold therein, and curing said curd in an air tight enclosure while in granular form at a temperature of from about 65° F. to 80° F. until the pH of said curd is between about 5.00 and 5.40, whereby a cheese product having the characteristic flavor of aged cheese is provided in a substantially reduced curing period.

5. The method of making American cheese having a highly developed flavor which may be used in making process cheese and process cheese products, which method comprises the steps of setting milk with rennet, cutting the resulting curd, cooking said curd and expelling the whey therefrom, salting said curd while in granular form at a whey acidity of between about 0.40 to 0.60 with an amount of salt so that said curd has a total salt content of from about 1.1 to 1.3 percent, reducing the moisture of said curd to from about 31 to 35.5 percent, applying a vacuum to said curd and introducing nitrogen into said curd in order to reduce the formation of mold therein, and curing said curd in an air tight enclosure at a temperature of from about 72° F. to 74° F. until the pH of said curd is between about 5.00 and 5.35, whereby a cheese product having the characteristic flavor of aged cheese is provided in a substantially reduced curing period.

6. The method of making American cheese having a highly developed flavor which may be used in making process cheese and process cheese products, which method comprises the steps of setting milk with rennet, cutting the resulting curd, cooking said curd and expelling the whey therefrom, salting said curd while in granular form at a whey acidity of between about 0.40 to 0.60 with an amount of salt so that said curd has a total salt content of from about 1.1 to 1.3 percent, introducing an excess of nitrogen into said curd, and sealing said curd in air tight containers while retaining the excess of nitrogen therein, and curing said curd in said containers at a temperature of from about 72° F. to 74° F. until the pH of said curd is between about 5.05 and 5.10, whereby a cheese product having the characteristic flavor of aged cheese is provided in a substantially reduced curing period.

References Cited in the file of this patent

UNITED STATES PATENTS

| | | |
|---|---|---|
| 2,494,638 | Stine | Jan. 17, 1950 |
| 2,796,351 | Walter et al. | June 18, 1957 |
| 2,871,126 | Smith et al. | Jan. 27, 1959 |
| 2,942,983 | Sadler et al. | June 28, 1960 |
| 3,017,274 | Dahlstrom | Jan. 16, 1962 |

UNITED STATES PATENT OFFICE
CERTIFICATE OF CORRECTION

Patent No. 3,175,915                                    March 30, 1965

Jack E. Murphy

It is hereby certified that error appears in the above numbered patent requiring correction and that the said Letters Patent should read as corrected below.

Column 1, line 31, for "ot" read -- to --; line 45, for "yeear" read -- year --; column 5, line 46, for "posisble" read -- possible --; column 7, line 31, for "II" read -- III --.

Signed and sealed this 24th day of August 1965.

(SEAL)
Attest:

ERNEST W. SWIDER
Attesting Officer

EDWARD J. BRENNER
Commissioner of Patents